Jan. 11, 1955   M. G. NELSEN ET AL   2,699,242
COIN MECHANISM
Filed Dec. 3, 1949   9 Sheets-Sheet 2

Inventors
Marvin G. Nelsen
John Schmidt
By Bair & Freeman
Attorneys

Jan. 11, 1955    M. G. NELSEN ET AL    2,699,242
COIN MECHANISM
Filed Dec. 3, 1949    9 Sheets-Sheet 7

Inventors
Marvin G. Nelsen
John Schmidt
By Bair & Freeman
Attorneys

Jan. 11, 1955   M. G. NELSEN ET AL   2,699,242
COIN MECHANISM
Filed Dec. 3, 1949   9 Sheets-Sheet 8

Jan. 11, 1955   M. G. NELSEN ET AL   2,699,242
COIN MECHANISM
Filed Dec. 3, 1949   9 Sheets-Sheet 9

Inventors.
Marvin G. Nelsen
John Schmidt
By Bair & Freeman
Attorneys

United States Patent Office 2,699,242
Patented Jan. 11, 1955

2,699,242

COIN MECHANISM

Marvin G. Nelsen and John Schmidt, Chicago, Ill., assignors to Guardian Electric Manufacturing Co., Chicago, Ill., a corporation of Illinois Application December 3, 1949, Serial No. 130,924

9 Claims. (Cl. 194—10)

This invention relates to coin mechanisms and is particularly applicable to coin controlled mechanisms in which coins of different denominations are utilized.

While the invention is described in connection with a coin mechanism for vending mechanisms including a change maker, it is not limited to such vending or change making apparatus except where the claims include the change making apparatus.

It is an object of the invention to provide an improved coin mechanism for apparatus which dispenses services, goods, and change.

It is a further object of the invention to provide an improved change maker and coin accept and return mechanism.

It is also an object of the invention to provide improved apparatus for blocking coins in the coin mechanism under certain conditions and effecting return of coins that are blocked.

It is also an object of the invention to provide improved apparatus for automatically returning coins which are placed in the coin mechanism under some conditions and to provide for blocking of coins under other conditions, which blocked coins may be manually returned.

It is an additional object of the invention to provide for automatic return of coins under certain conditions by utilizing many of the parts of a standard coin rejecting mechanism and to provide for manual return of certain coins which are blocked under some conditions by using existing parts of such a standard coin rejecting mechanism.

It is a still further object of the invention to provide for the return of coins by automatically opening one of the gates of a standard rejecting mechanism under certain conditions.

It is a further object of the invention to provide, in a unit embodying a coin changer, automatic return of coins of all denominations when the merchandise magazine is empty, during the vending cycle, and at the time the machine tends to jackpot, which tendency is caused by a coin of single unit denomination, such as a nickel, being lodged or stuck on the cycle actuating switch or by its coin controlled switch remaining closed when it should be open; and further to block coins of multiple unit denomination if one of their control switches remains closed when it should be open, still permitting operation by a coin of unit denomination.

It is a very important object of the invention to prevent the "5¢ only" light from being illuminated during the vending operation.

It is an additional object of the invention to provide for acceptance of the coin of lowest denomination and automatic blocking of coins of higher denomination, with manual return, when the magazine for making change with the coin of lowest denomination has insufficient coins therein.

It is a further object of the invention to provide a coin control for a vending apparatus in which, if two coins are inserted, one immediately after the other, only one vending cycle will be completed.

With these and other objects in view, our invention consists in the construction, arrangement and combination of the various parts of our device whereby the objects contemplated are attained as hereinafter more fully set forth, pointed out in our claims, and illustrated in the accompanying drawings, in which:

Figure 1:
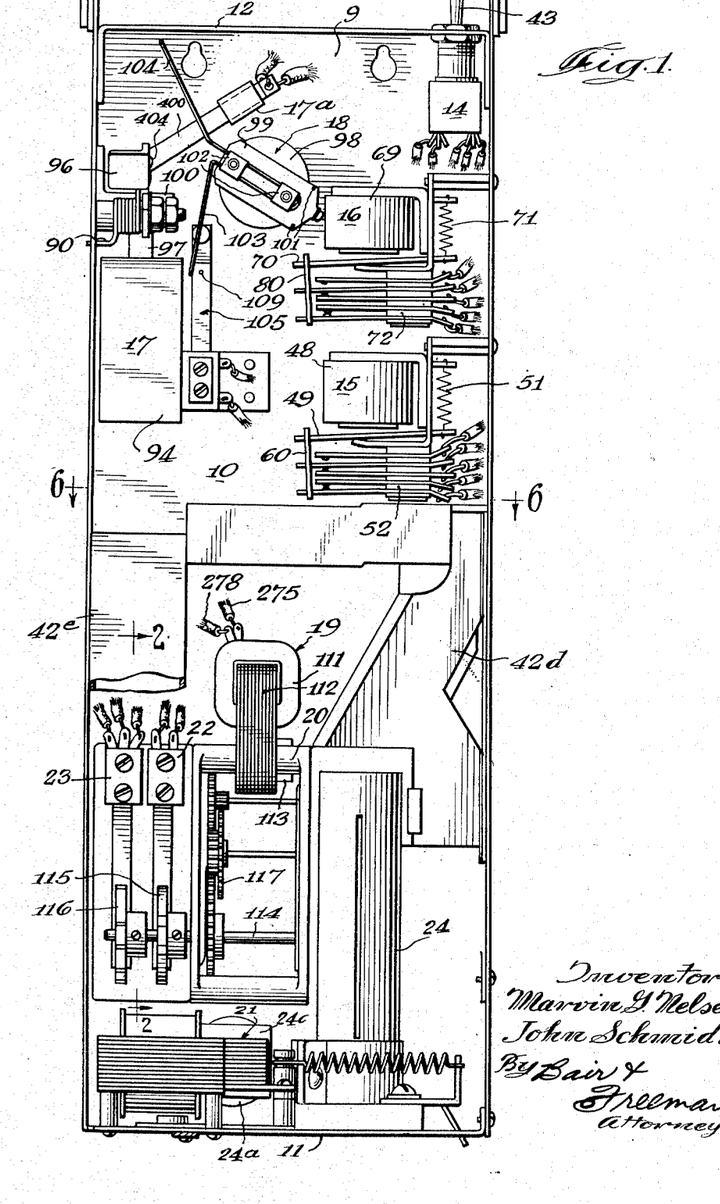
Figure 1 is a front elevational view of a coin mechanism for vending machines including a change maker, with the standard coin rejecting mechanism removed.

Referring specifically to the drawings for a detailed description of the present invention, and particularly to Figure 1, numeral 10 designates an open front box, preferably of metal, upon which certain component parts for the present invention are mounted. The box 10 is preferably mounted vertically and includes a bottom wall 11, a top wall 12 and an intermediate partition 13. The base of the box 10 is designated by numeral 9.

A two-pole, double throw drain switch 14 is mounted on the top wall 12 for continuous draining of the change coins in the mechanism when desired. The invention is described as applying to nickels, dimes and quarters and to vending of a nickel article or service, although it is obvious that coins, chips or tokens of other denominations may be utilized and articles of different prices may be vended. The nickels are, therefore, referred to as coins of "unit denomination" while the other coins are sometimes referred to as coins of "multiple unit denomination." Nickels are the coins given in change, in the device as described.

Figure 17:
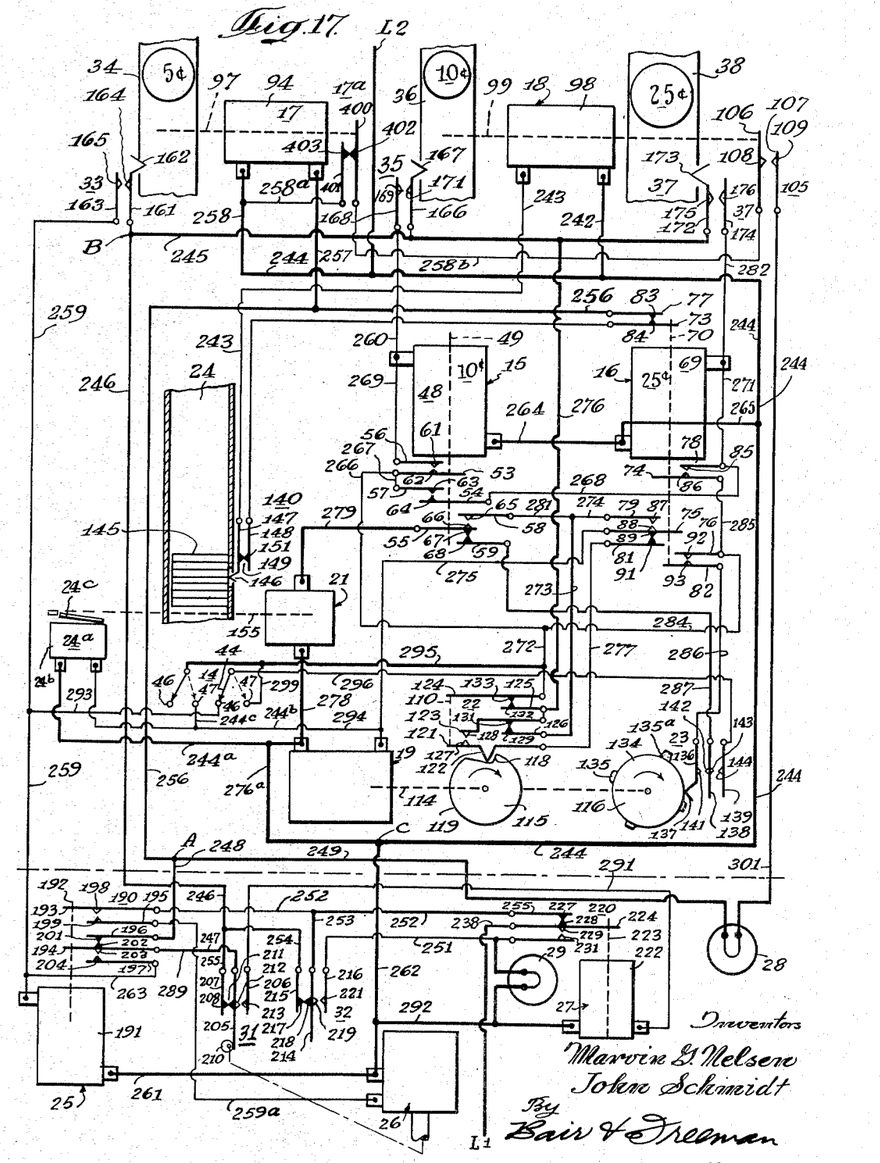
Figure 17 is a wiring diagram for the complete apparatus.
Figure 18:
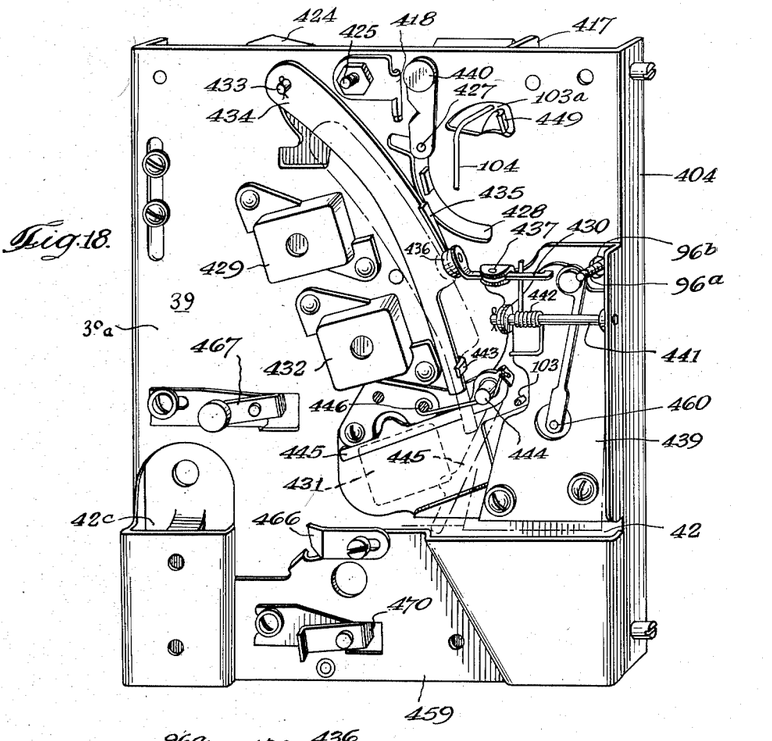
Figure 18 is a back view of the coin rejecting mechanism.
Figure 19:
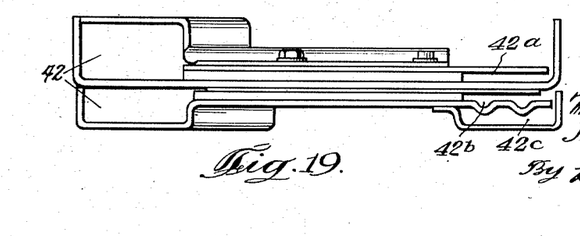
Figure 19 is a bottom view of the coin rejecting mechanism, with parts removed for the sake of clarity.
Figure 20:
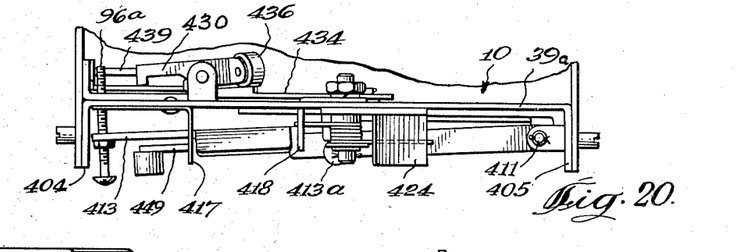
Figures 20 and 21 are top views of the coin rejecting mechanism with the main gate in the open and closed positions, respectively.
Figure 21:
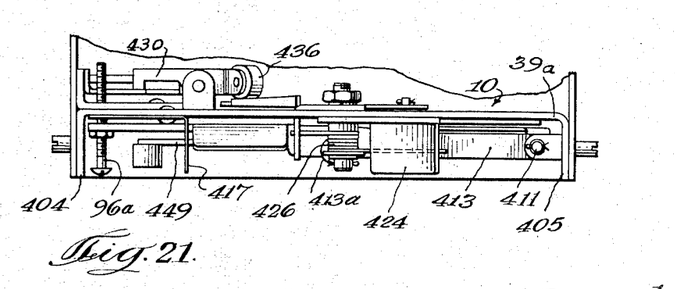

Referring to Figures 1 and 17, a 10¢ or dime relay 15, and a 25¢ or quarter relay 16, are mounted on the base 9. A dime and quarter block relay generally indicated by numeral 18 is mounted on base 9.

A motor 19 is mounted on a bracket 20 which is in turn also mounted on base 9. The change payout solenoid 21 and a change magazine 24 are secured to the bottom wall 11 of box 10. A slide lock mechanism 24a is mounted on the base 9 for a purpose hereinafter described. A pair of cam operated switches 22 and 23 are also mounted on base 9. A switch generally indicated at 17a is mounted on base 9 and is adapted to be operated by a coin return relay or mechanism 17.

As shown in Figure 17, other components which are part of the vending machine control, as distinguished from the change maker, comprise a vend relay 25, a vend motor 26, an anti-jackpotting relay 27, a "5¢ only" lamp 28 and an "empty" lamp 29, a limit switch 31 and an empty switch 32.

Figure 6:
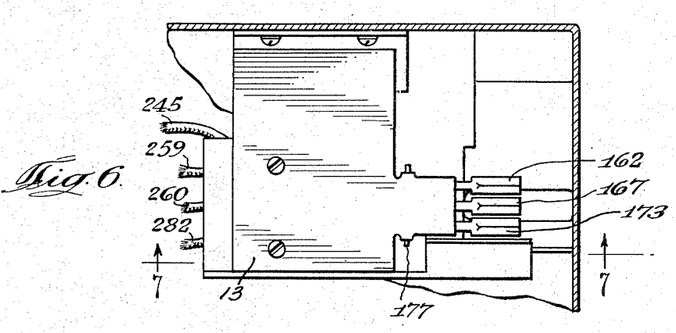
Figure 6 is a partial sectional view of the apparatus shown in Figure 1, taken on line 6—6 thereof.

A standard coin rejector mechanism is shown best in Figures 12 and 18 to 26, inclusive, and is designated generally by numeral 39. The coin rejector mechanism is modified slightly, as will be described hereinafter. The mechanism 39 is adapted to be secured to the box 10 at the upper portion thereof above the partition 13 by any suitable means (not shown). Nickel, dime and quarter operated switches indicated at 33, 35 and 37 respectively, are disposed below the corresponding outlet from the coin chutes in mechanism 39, as shown in Figure 6, and as diagrammatically shown in Figure 17. A single inlet for coins of all three denominations is shown at 41 in Figure 12, and the coins are directed into the proper chute by selector mechanisms, to be hereinafter described, assuming that the coin is acceptable. The accepted nickels, dimes and quarters are directed to accept passages 42a, 42b or 42c (Figure 19) depending on whether a nickel, dime or quarter is used. All accepted coins fall through a passage 42d (Figure 1) into a suitable coin collecting box (not shown).

Return chutes are shown at 42, which open into a return passage 42e positioned below return chute 42. The coin mechanism 39 and the coin chutes formed therein are so positioned that the dime and quarter blocking relay will be effective to prevent operation of the dime and quarter coin switches 35 and 37 under certain conditions, as will become apparent as the description proceeds. Mechanism is also provided for automatically directing coins of all denominations into the return chutes 42 and return passage 42e, under certain conditions, and requiring manual return to chutes 42 under other conditions, as will also become apparent as the description proceeds.

Referring again to Figures 1 and 17, the drain switch 14 is operated by a manually movable member 43 which extends above the top wall 12 of the box 10. The switch comprises a pair of movable switch arms 44 and two pairs of fixed contacts 46 and 47. The wiring diagram in Figure 17 shows all parts and switches in the position wherein a cycle of operation may be initiated by the insertion of a nickel, dime or quarter into the coin mechanism 39.

The dime relay 15 includes a coil 48 which is adapted to attract an armature 49 when energized. Normally, the armature is maintained in the unattracted position, as shown in Figure 1, by a spring 51. The armature 49 is adapted to operate a plurality of switch arms which are assembled in a switch, generally indicated at 52.

The dime relay 15 operates movable contact arms 53, 54 and 55. Associated with the switch 52 are relatively fixed contact arms 56, 57, 58 and 59. Throughout the description of the contact arms of the switches, it is to be understood that the arms are formed of flexible metal and bend or return to their initial positions shown in Figure 17 due to the inherent resilience thereof, when not biased to another position by some mechanical means. A contact 61 is provided on contact arm 56 and is adapted to engage a contact 62 on switch arm 53. A contact 63 is provided on contact arm 57 and is adapted to engage with a contact 64 on movable contact arm 54. A contact 65 is provided on contact arm 58 and is adapted to engage with a contact 66 on movable contact arm 55. A contact 67 on movable contact arm 55 is adapted to engage with a contact 68 on contact arm 59. A rigid member 60 engages with the armature 49 and the movable contact arms 53, 54, 55, in order to impart movement thereto.

The quarter relay 16 includes a coil 69 which is adapted to attract an armature 70 thereto. The armature 70 is normally maintained in the unattracted position by a spring 71. The armature 70 is adapted to operate a switch, generally indicated at 72. The switch includes movable contact arms 73, 74, 75 and 76. Also associated with the switch are relatively fixed contact arms 77, 78, 79, 81 and 82. The movable contact arms are secured to the armature 70 by a member 80 which imparts movement to the contact arms when the armature is moved.

A contact 83 is secured to the contact arm 77 and is adapted to engage with a contact 84 on movable switch arm 73. A contact 85 on switch arm 78 is adapted to engage with a contact 86 on movable switch arm 74. A contact 87 on switch arm 79 is adapted to engage with a contact 88 on movable switch arm 75. A contact 89 on movable switch arm 75 is adapted to engage with a contact 91 on switch arm 81. A contact 92 on movable switch arm 76 is adapted to engage with a contact 93 on switch arm 82.

Figures 13, 14, 15:
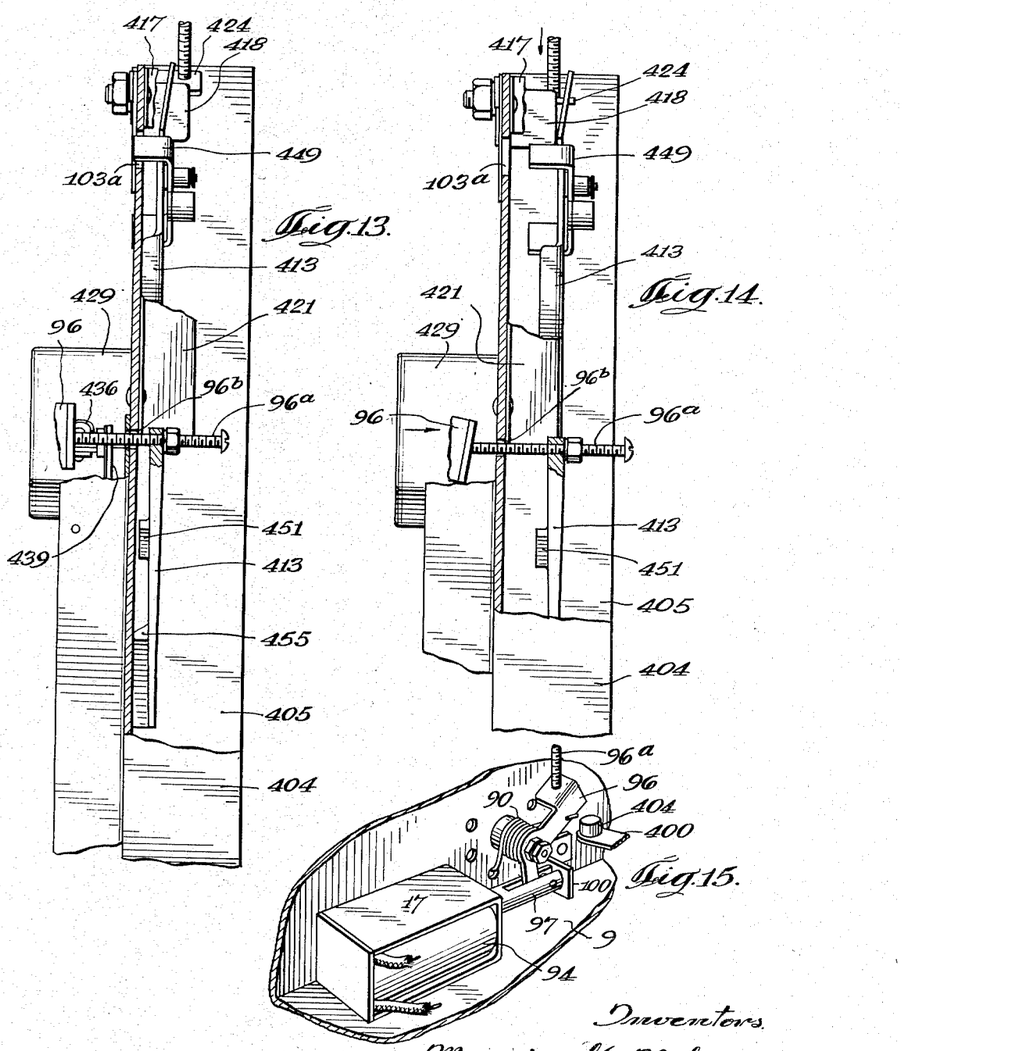
Figure 13 is a side view of the mechanism shown in Figure 12, with one of the side flanges removed, showing the apparatus in the position it assumes under certain conditions.
Figure 14 is a view similar to Figure 13 with the parts shown in the position they assume when it is desired to automatically reject coins.
Figure 15 is a perspective view of the mechanism for moving the coin rejecting mechanism to the position where coins will be returned.

The coin return mechanism 17 includes a coil 94 which is adapted to operate an armature 97, as best shown in Figures 1 and 15. The armature 97 is pivotally connected to a bell crank lever 96 and is biased to its extended position by a spring 90. The bell crank lever 96 engages with a threaded rod 96a secured to one of the gates of the rejector mechanism 39 and extending through an opening 96b in the vertical plate or main body member 39a. A stop bracket 100 is provided for limiting the outward movement of the armature 97 and bell crank lever 96.

Figure 16:
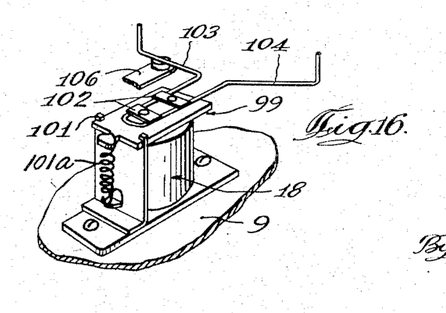
Figure 16 is a perspective view of the coin blocking relay and fingers.
Figure 23:
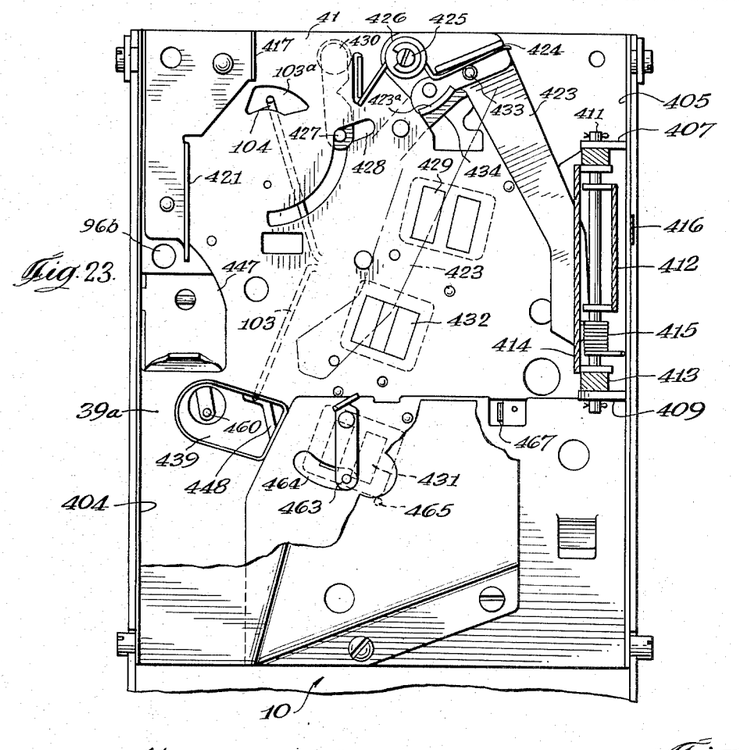
Figure 23 is a front view of the coin rejecting mechanism with parts removed for the sake of clarity.

The dime and quarter blocking relay 18 includes a coil 98 which is adapted to move an armature 99 (Figures 1 and 16) hinged at 101. A spring 101a is adapted to normally maintain the armature in the unattracted position. The armature 99 has a bracket 102 secured thereto and dime and quarter blocking fingers 103 and 104, respectively, are secured at the extremities of the bracket 102. The blocking fingers 103 and 104 extend through openings 448 and 103a in the dime and quarter coin passages, respectively, as best shown in Figure 23.

A switch generally indicated at 105 is also operated by the armature 99 of the dime and quarter block relay 18. The switch 105 includes a movable contact arm 106 and a relatively fixed contact arm 107. The movable contact arm 106 has a contact 108 thereon adapted to engage with a contact 109 on contact arm 107. The contacts 108 and 109 are closed when the dime and quarter blocking relay 18 is de-energized and are open when it is energized.

The motor 19, which is mounted on the bracket 20, includes a coil 111 and a stator 112. The motor 19 may be of any well-known shaded pole type. The motor 19 includes a rotor 113 which is adapted to rotate a shaft 114 through a gear chain 117, when power is applied to the motor. The shaft 114 in turn rotates a cam 115 and a cam 116 for actuating switches 22 and 23, respectively.

Figures 9, 10:
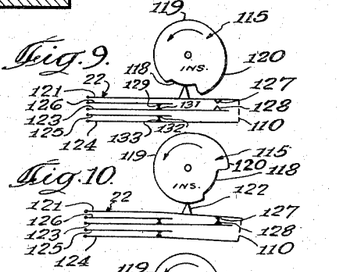
Figure 9 is a diagrammatic view of one of the motor operated cams and the switch associated therewith, with the parts in the position they assume at one part of the cycle.
Figure 10 is a view similar to Figure 9 at another part of the cycle.
Figure 11:
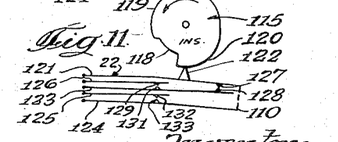
Figure 11 is a view similar to Figures 9 and 10 at still another part of the cycle.
Figure 12:
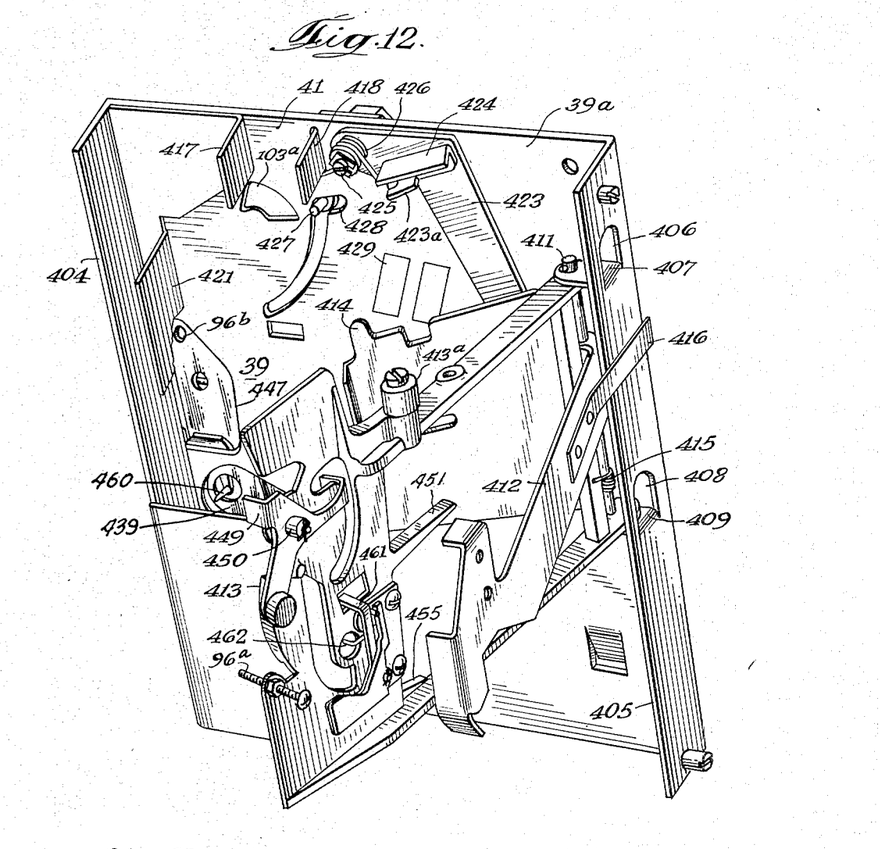
Figure 12 is a perspective view of the coin rejecting mechanism modified in accordance with this invention.

The cam 115 is provided with a notch 118 and with a smooth high surface 119. It is also formed with a raised portion 120 (Figures 9 and 11). The cam 115 is adapted to move a movable switch arm 121 and a movable switch arm 124, which are connected together by a member 110 on switch 22. The movable arm 121 has a V-shaped projection 122 which is adapted to either ride on the surfaces 119 and 120 of the cam 115 or to be positioned in the notch 118 to operate the switch arms 121 and 124, in a manner to be described.

Also associated with switch 22 are contact arms 123, 125, and 126. A contact 127 on movable contact arm 121 is adapted to engage with a contact 128 on contact arm 123. A contact 129 on contact arm 126 is adapted to engage with a contact 131 on contact arm 123. A contact 132 on contact arm 125 is adapted to engage with a contact 133 on contact arm 124.

The cam 116 is provided with a smooth lower surface 134 and with three raised portions 135 and a fourth raised portion 135a which is higher than portions 135. The portions 135 are adapted to move movable switch arm 136 on switch 23. The portion 135a is adapted to move both switch arms 136 and 138. The movable switch arm 136 is provided with a V-shaped projection 137 which either rides on the smooth surface 134 of the cam 116 or is raised by the projections or cam surfaces 135 thereof.

The switch 23 includes a switch arm 139. The movable switch arm 136 has a contact 141 thereon adapted to engage with a contact 142 on switch arm 138. A contact 143 on switch arm 138 is adapted to engage with a contact 144 on switch arm 139.

Figures 2, 3, 4:
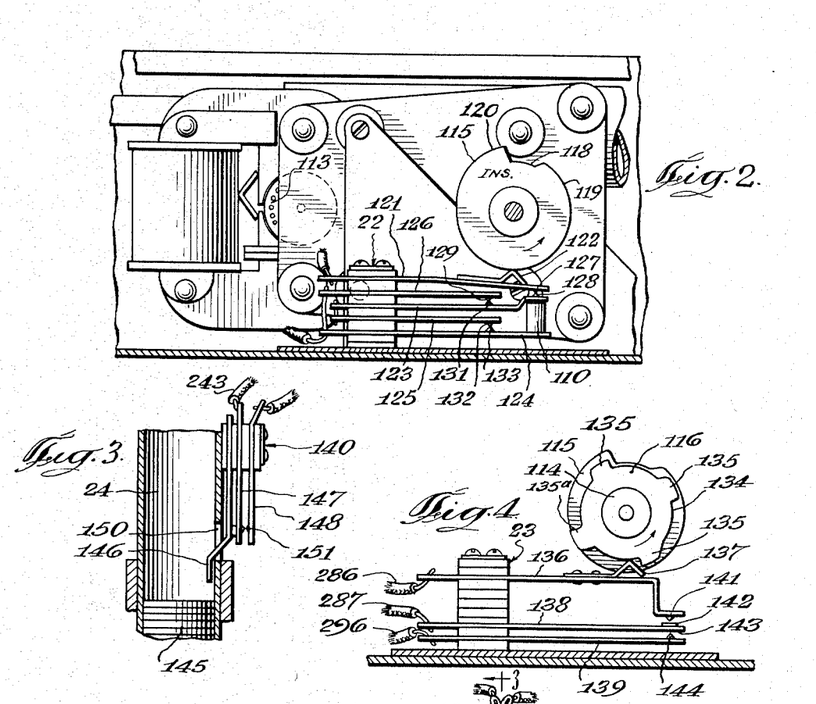
Figure 2 is a partial sectional view of the apparatus shown in Figure 1, taken on line 2—2 thereof.
Figure 3 is a partial sectional view of the coin magazine taken on line 3—3 of Figure 5.
Figure 4 is a view of the motor-operated cams and one of the switches operated thereby.
Figure 5:
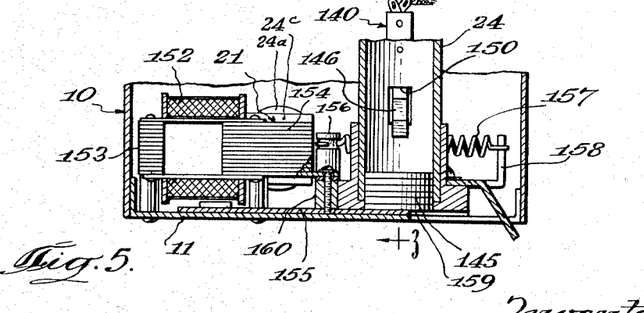
Figure 5 is a partial sectional view of the payout solenoid, coin magazine and associated apparatus.

Referring now to Figures 3, 5, and 17, the coin magazine 24 normally has a plurality of nickels therein, shown at 145. A switch 140 is associated with the coin magazine to insure that sufficient coins are present therein for giving change for at least one quarter when a coin of such denomination is used. The switch 140 includes a movable member 146 which projects through an opening 150 in the side of the coin magazine 24. The switch 140 also includes a switch arm 147 secured to the member 146 and a switch arm 148.

A contact 149 is secured to the switch arm 147 and is adapted to engage a contact 151 on switch arm 148 when sufficient coins 145 are contained in the magazine 24.

Referring to Figures 1, 5 and 17, the change pay out mechanism 21 includes a coil 152, a laminated metal core 153, and a slidable armature 154. The armature 154 is connected to a plate 155 by means of an upright stud 160, which plate slides on the bottom 11 of the box 10. An ear 156 is secured to the stud 160 and a spring 157 is secured to the ear 156 and to a rigid bracket 158, which is in turn secured to the box 10. The spring 157 biases the armature 154 to its unattracted position. An aperture 159 is provided in the bottom of the magazine 24 so that coins may be released therefrom by gravity when the plate 155 is moved by armature 154.

Referring now to Figures 6 and 17, the nickel coin switch 33 includes a movable contact arm 162 which is disposed in a position to be engaged by a nickel from nickel coin chute 34 and 42a. The coin switches 33, 35 and 37 are shown to be of the type which are operated to close a switch momentarily upon the passage of a coin. However, the invention is not limited thereto but is also applicable to coin switches in which coins are released by mechanical means, such as cams, at a predetermined time, and the coin switch associated therewith is returned to the initial position at that time.

The nickel switch 33 has a finger 162 which will be struck by a nickel passing through the coin chute 34 and 42a. The switch also includes a switch arm 163. A contact 164 on the movable switch arm 161 is adapted to engage with a contact 165 on the switch arm 163. The dime switch 35 includes a movable switch arm 166 to which is secured a finger 167 which is adapted to be struck by a dime as it passes through coin chute 36 and 42b. The switch 35 also includes a contact arm 168 and a movable contact arm 166 has a contact 171 thereon adapted to engage with a contact 169 on contact arm 168.

Figure 7:
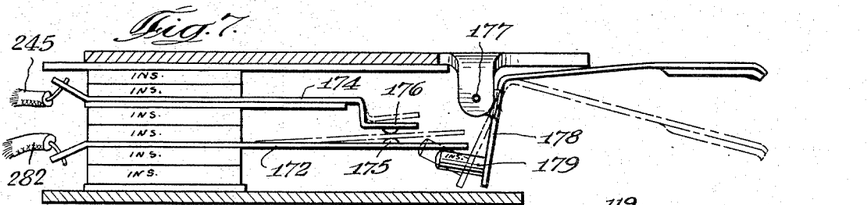
Figure 7 is a partial sectional view of the coin-operated switches, taken on line 7—7 of Figure 6.

The quarter switch 37 is shown in greater detail in Figure 7 and it is understood that all three of the coin switches are identical in construction. The quarter switch 37 includes a movable contact arm 172 and a relatively fixed contact arm 174. A finger 173 is adapted to be struck by a quarter when it passes through the chute 38 and 42c. The movable contact arm 172 has a contact 175 thereon which is adapted to engage with a contact 176 on contact arm 174. The finger 173 is pivoted at 177 and is provided with a bell crank extension 178 having a pusher projection 179 thereon, so that, as the finger 173 is moved to the dotted line position shown in Figure 7 of the drawings, the projection 179 engages the movable switch arm 172 and closes contacts 175, 176. The movable arm 172 is inherently resilient and as soon as the coin has passed by the finger 173, it swings the finger to the full line position, shown in Figure 7, and contacts 175 and 176 open.

As best shown in Figures 1, 15 and 17, the switch 17a comprises a movable contact arm 400 and a relatively fixed contact arm 401. The contact arms 400 and 401 carry normally closed contacts 402 and 403 respectively. The movable contact arm 400 has a button 404 secured to its end which is adapted to be engaged by the bell crank lever 96 when the armature 97 of coin return relay 17 is retracted. When the bell crank lever 96 engages movable contact arm 400 it depresses the same and opens contacts 402 and 403.

Referring now to Figure 17 for a detailed description of a portion of the vending apparatus, the vend relay 25 includes a coil 191 which operates an armature 192. The armature 192 is normally maintained in its unattracted position by a spring (not shown) and is only moved to the attracted position each time a coin is inserted in the coin chutes. The armature 192 operates a switch generally indicated by the numeral 190 which includes movable contact arms 193 and 194 and fixed contact arms 195, 196 and 197. The movable contact arm 193 has a contact 198 thereon which is adapted to engage with a contact 199 on contact arm 195. A contact 201 is provided on contact arm 196 and is adapted to engage with a contact 202 on contact arm 194. A contact 203 on contact arm 194 is adapted to engage a contact 204 on contact arm 197.

The "limit" switch 31 includes a movable contact arm 205 and two relatively fixed contact arms 206 and 207. A contact 208 is provided on contact arm 207 and is adapted to engage with a contact 211 on contact arm 205. A contact 212 on contact arm 205 is adapted to engage with a contact 213 on contact arm 206.

The "empty" switch 32 includes a movable contact arm 214 and fixed contact arms 215 and 216. The contact arm 215 has a contact 217 thereon adapted to engage with a contact 218 on contact arm 214. A contact 219 on contact arm 214 is adapted to engage with a contact 221 on contact arm 216.

Figure 8:
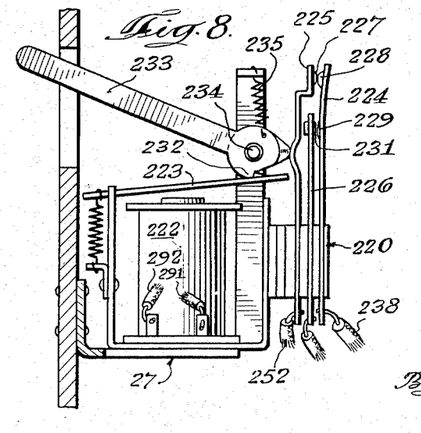
Figure 8 is a detail view of the latching relay for rendering the apparatus completely inoperative under certain conditions.

The "anti-jackpotting" relay 27, shown in Figures 8 and 17, is a latch type relay and includes a solenoid 222 and an armature 223. Relay 27 operates a switch generally indiacted at 220 which includes a movable switch arm 224 and relatively fixed switch arms 225 and 226. The switch arm 225 is provided with a contact 227 which is adapted to engage with a contact 228 on movable contact arm 224. A contact 229 is provided on contact arm 224 which is adapted to engage with a contact 231 on contact arm 226.

The switch 220 is normally maintained in the position shown in Figure 17 by a latch generally indicated at 232, as shown in Figure 8. A manually movable arm 233 is pivoted at 234 and is biased in a clockwise direction by a spring 235. When coil 222 is energized, it attracts armature 223 and latch 232 is unlatched. Contacts 225, 227, therefore, open and contacts 229, 231 close. The contacts remain in such position until the arm 233 is manually raised to re-latch latch 232.

*Coin rejecting mechanism*

Referring now to Figures 12 and 18 to 26 for a description of a standard National Rejectors, Inc. coin rejecting mechanism which may be used, although other standard forms may be substituted, flanges 404 and 405 are provided on the mounting or base plate 39a. The flange 405 is cut as shown at 406 and 408 and flaps 407 and 409 are bent so that they are disposed horizontally. A hinge pin 411 is mounted in the flaps 407 and 409, and three gates 412, 413 and 414 are rotatably mounted on the hinge pin 411. A spring 415 biases the main gate 413 toward the closed position and this in turn engages and tends to retain the inner gate 414 in a closed position. Quarter and nickel magnets, designated at 429 and 432, also hold the gate 414 closed, since it is formed of magnetic material. A second spring 416 formed from strap material biases the outer gate 412 towards the closed position.

A pair of flanges 417 and 418 define the coin insert passage 41. Another flange 421 defines a portion of the reject coin path, as will be described hereinafter. The aperture 96b is to the left of the flange 418 as viewed in Figures 12 and 23, and the threaded pin 96a, which is attached to the gate 413, extends through the aperture 96b to a position where it may be moved by the bell crank lever 96.

A wiper blade 423 having an up-turned flange 424 at the top thereof, is hinged on a pin 425. The wiper blade is biased in one direction by a spring 426. The wiper blade has a projection 423a at the top thereof which is adapted to ride beneath a roller 413a on the gate 413. When the wiper blade is manually operated, the projection 423a engages with the roller 413a and moves the gate 413 to a position approximating that shown in Figure 20. The mechanism 39 is provided with nickel, dime and quarter magnets 429, 431 and 432 respectively. These magnets serve the function of testing the acceptability of coins and also will stop coins formed of magnetic material.

The wiper blade 423 in the front of the coin rejecting mechanism 39 is hinged at 433 to a blade 434 in back of the mechanism 39. The back blade 434 is provided with a projection 435 which is adapted to engage with a roller 436 which is attached to an arm 430 pivoted at 437. The arm 430 engages with a gate 439 which is pivoted on a horizontal pin 441. A spring 442 biases the gate 439 toward the closed position. A guide flange 443 is provided for guiding the movement of the rear blade 434. A lever 445 is pivoted on a pin 444. A spring 446 biases the lever 445 into engagement with the blade 434. The lever 445 sweeps across the dime magnet 431 when operated. The blade 434 opens the gate 439 when operated. The wiper blade 423 sweeps across the nickel and quarter magnets 429 and 432. It is clear, therefore, that if a slug of magnetic material sticks on the magnets 429, 431 or 432, operation of the blades 423, 434 and 445 will dislodge the same and will also open the gates 413 and 439 so that coins may be directed to the reject chutes 42. The path of the rejected coins is shown by the full line arrows in Figure 22. The path of the accepted coins is shown by the dotted line arrows in Figure 22.

The base plate 39a is provided with an aperture 103a (Figure 23) through which the quarter blocking pin 104 extends. The plate 39a is also provided with an aperture 448 through which the dime blocking pin 103 extends. A quarter pendulum is shown at 427 and is pivoted at 440. The pendulum extends through an opening 428 in the base plate 39a.

Figure 22:
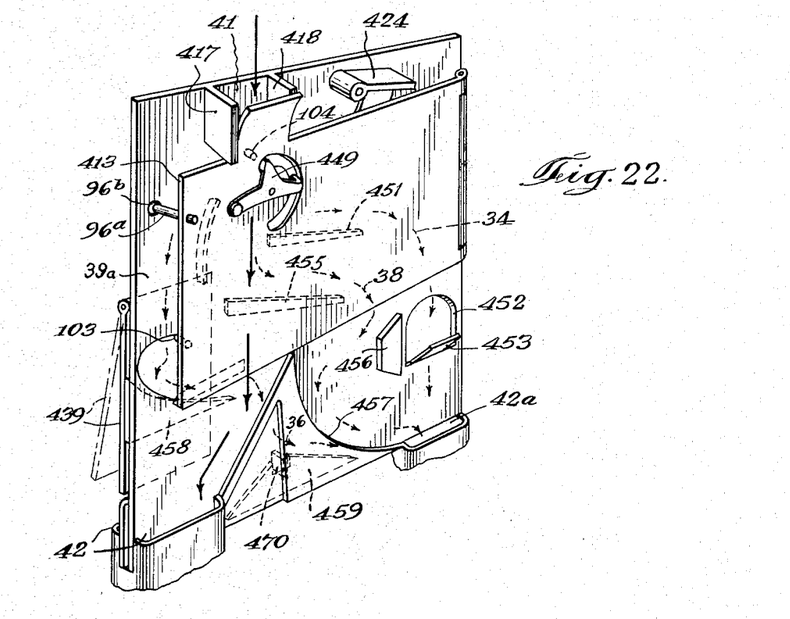
Figure 22 is a schematic drawing of the coin rejecting mechanism showing the various coin paths.
Figures 24, 25:
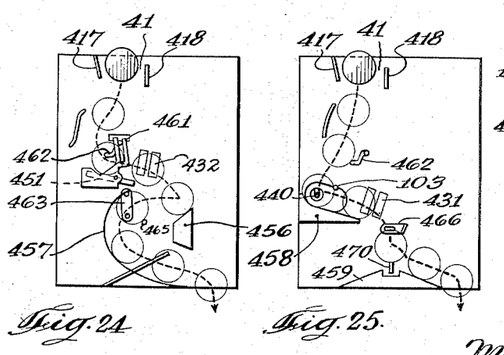
Figures 24, 25 and 26 are diagrammatic views illustrating the paths of coins of different denominations when they are accepted, or are manually ejected.
Figure 26:
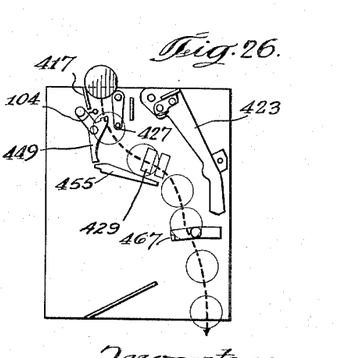

A quarter undersize lever 449 is pivoted on the gate 413 by means of a pivot pin 450. The gate 413 has an upper track 451 thereon for nickels and a lower track 455 for quarters. A quarter separator is shown at 467. A dime deflector is shown at 466, and a dime trackway on gate 439 is shown at 458 (Figure 22). A dime pin for retaining washers or the like is shown at 460. An accepted quarter trackway is shown at 457 and a dime separator is shown at 470 (Figures 22 and 25). A second dime trackway is shown at 459. A nickel undersize wire and levers are attached to the gate 413 and are shown at 462 and 461 respectively. A nickel anvil is shown at 456. An aperture 452 provided with a deflector 453 separates nickels and quarters, and directs them to the proper passage 42a or 42c. A nickel separator stud is shown at 465 and a nickel pendulum is shown at 463 and extends through a slot 464 in the plate 39a.

Referring now to Figures 22, 24, 25 and 26, the paths of the nickel, dime and quarter, respectively, are shown diagrammatically. When a genuine nickel is dropped in the coin insert 41, it passes through the quarter undersize lever 449 and engages the nickel undersize lever 461. The lever 461 will turn slightly on its pivot if the nickel is of the correct diameter permitting it to drop on the nickel rail 451. The genuine nickel, having a high electrical resistance, will roll down the nickel rail 451 between the nickel magnets 429 at a high rate of speed, striking the nickel anvil 456, from which it will rebound with enough force to clear the nickel separator rivet 465, and will be directed into the accept chute 42a after rolling down the rail 457. Spurious nickels will be rejected by the rejector mechanism, but this operation need not be described since it forms no part of the present invention.

Genuine dimes take the path shown in Figure 25. When a genuine dime is dropped into the coin insert 41, it passes through the quarter under size lever 449 and to the left of the nickel undersize wire 462. At the bottom edge of the main scavenger 413, the dime is deflected through an opening 447 (Figure 23) in the main plate 39a, and is deposited on the dime runway 458. The dime rolls down the runway 458, passing through the magnetic field of magnets 431. The speed of the dime as it leaves the runway is retarded sufficiently by the eddy currents set up between the magnets 431 to prevent it from striking the dime deflector 466, but the dime still follows a wide enough arc to drop on to the dime separator 470 with the center of gravity to the right, so it will roll to the right on trackway 459. The dime is, therefore, deflected into the accept channel or chute 42b. Again the spurious dimes will be rejected, but this forms no part of the present invention and no description thereof is necessary.

When a genuine quarter is dropped into the coin insert 41, it drops into the arms of the quarter undersize lever 449, which turns under the weight of the coin and deposits it on the inclined quarter rail 455 on gate 413. As the quarter rolls down the rail past the quarter magnet 432, its speed is checked by generated eddy currents, and it leaves the rail in an arc that will permit it to miss the main wiper blade 423, and land with its center of gravity to the right of the quarter separator 467, and thus be directed to the accept chute 42c.

If the gate 413 is open because of the fact that the coin reject relay 17 is deenergized, all coins which are inserted in the coin insert 41 will follow the general path shown by the full arrows in Figure 22. Nickels, quarters and dimes will drop through the front reject chute 42. The spring 90 of mechanism 17 is obviously sufficiently strong to overcome the spring 415 which tends to bias gate 413 toward the closed position.

If the blocking pins 103 and 104 are extending through the openings 103 and 448 because of the fact that the block relay 18 is de-energized and assuming that the coin reject relay is energized and the gate 413 closed, dimes or quarters will be stopped by the pins 103 and 104. Quarters are stopped because pin 104 prevents the quarter undersize lever 449 from rotating and dropping the quarter into the accept path. In order to return dimes and quarters under such a condition, the blades 423, 434 and 445 must be operated to open the gates 413 and 439, and dislodge a dime from the pin 103. Opening gate 413 permits undersize lever 449 to rotate and drop the quarter. Quarters thus dropped will be directed to the front reject chute 42 while dimes will be directed to the rear reject chute 42. Under the conditions above specified with the gate 413 closed and the coin reject relay 17 energized, nickels will be accepted and the nickel coin switch may be operated to initiate a vending cycle.

Coins of all denominations will be by-passed to the return chutes when the merchandise magazine is empty and the empty switch 32 contacts are open. When these contacts are open, the coin return relay 17 is de-energized, thus pushing gate 413 open so that all coins will be returned through the front chute 42.

As soon as the vending cycle starts, the coin reject relay 17 is also de-energized because contacts 201 and 202 of the vend switch open. Again, all coins are returned through the front chute 42.

Furthermore, if a nickel becomes lodged or stuck on the nickel switch 33, the anti-jackpot relay 27 is energized and contacts 229, 231 open so that no power may be supplied to the entire mechanism. Gate 413 is therefore opened and all coins are returned through the front return chute 42.

Although under some conditions, the block relay 18 is also de-energized at the same time the gate 413 is opened, the pins 103 and 104 do not extend into the coin paths a sufficient distance to cause blocking with gate 413 open.

If the nickel magazine does not have sufficient coins therein, contacts 149, 151 of the magazine switch 140 are open and block relay 18 is de-energized. However, assuming that other conditions are suitable for vending with the insertion of a nickel, it is clear that the coin reject relay 17 is energized and gate 413 is closed. The "5¢ only" lamp 28 is illuminated to warn purchasers not to insert dimes and quarters. However, during the vending cycle, the "5¢ only" lamp is extinguished because coin reject relay 17 is de-energized and conatcts 402 and 403 of switch 17a are open.

If dimes or quarters are placed in the mechanism at the time when only nickels will be accepted, they are blocked by the pins 103 and 104. Manual operation of the blades 423, 434 and 445 will open the gates 413 and 439, and the coins will be dropped into the reject chutes 42 and returned.

*General operation*

As best disclosed in Figure 17, power is supplied to the circuits through lines L1 and L2. Before the mechanism is in condition for operation, such power must be supplied and a latch 232 of the anti-jackpotting relay must be in the latched position so that contacts 227, 228 are closed and contacts 229, 231 are open. It is again noted that throughout the description, the switch arms are of sufficient resiliency to position the switches with the proper contacts opened or closed when not biased to some other position by a mechanism such as a solenoid, a cam or the like. Furthermore, the contacts are shown in Figure 17 in the position they assume when the mechanism is in condition to perform a vend cycle.

With the power on, the contacts 227, 228 closed, and sufficient coins 145 in the magazine 24 to close contacts 149, 151 the block relay 18 will be energized to withdraw blocking fingers 103 and 104 a sufficient distance from the dime and quarter paths 36 and 38 that coins may pass therethrough and strike the fingers 167 and 173 of the dime and quarter switches 35 and 37.

The contacts 217, 218 of the empty switch must also be closed, and this is accomplished by the presence of merchandise in the vending machine in a manner well understood in the art.

Furthermore, contacts 208, 211 of the limit switch 31 must be closed, and this is accomplished by the inherent resiliency of the switch at the end of the vending cycle. A cam 210 may be provided to close the limit switch contacts 208, 211 and open contacts 212, 213 at the end of each vending cycle.

The vend switch contacts 201 and 202 are closed and solenoid 94 of coin return relay is, therefore, energized through a circuit hereinafter described, so that contacts 402, 403 of switch 17a are closed and the gate 413 of the coin rejector mechanism 39 is in its normally closed coin accepting position in which acceptable nickels, dimes and quarters will follow the paths described above.

When the vending system is in the above condition, the following circuits are established to energize the coin return relay 17 and permit gate 413 to be moved to its closed position by spring 415; through line L1, conductor 238, through closed contacts 227, 228 of the anti-jackpotting switch, through conductors 252, 253, through closed contacts 217, 218 of the empty switch, through conductors 254 and 255, closed contacts 208, 211 of the limit switch, through conductor 247, closed contacts 201, 202 of the vend relay, through conductors 248, 256 and 257, through coil 94 of the coin return relay 17 and through conductors 258 and 244 to line L2, thus energizing coin return relay 17 and closing contacts 402, 403 of the switch 17a.

It will be noted that at the junction point marked A in Figure 17, line L1 power exists as long as the vending relay 25, limit switch 31, empty switch 32, and anti-jackpotting relay 27 have their contacts in the position shown in Figure 17. It will, therefore, be unnecessary to again trace through these circuits if the conditions are as above.

In order to energize block solenoid 18, power from the point A passes through the conductor 256 through closed contacts 83 and 84 of the quarter relay 16, through closed contacts 149, 151 of the coin magazine switch 140, through conductor 243 to the coil 98 of the relay 18, and through the conductors 242, 244 to line L2, thus energizing the block relay 18, withdrawing the fingers 103, 104 from the dime and quarter coin chute, and opening contacts 108, 109 of switch 105 associated with the block relay 18. It is to be noted that the block relay 18, when energized to open contacts 108, 109 of switch 105, prevents power from being supplied through the "5¢ only" lamp 28 regardless of whether the contacts of coin magazine switch 140 and coin return relay switch 17a are opened or closed. The purpose of the "5¢ only" lamp will be described in more detail hereinafter.

*Nickel operation*

Assuming the contacts to be in the positions shown in Figure 17, and the relays 17 and 18 energized, as a nickel is placed in the slot 41 of the mechanism 39, and it is a proper coin, it will pass through the nickel path 34 described above, and will strike finger 162 to momentarily close contacts 164 and 165. The nickel will then enter the accept coin passage 42d and be directed to the nickel magazine 24 or to a coin box (not shown) if the nickel magazine is full. The following circuits are thereupon established to operate the vend motor one cycle and to vend one article of the merchandise; first, the vend relay 25 is energized by a circuit from line L1 through conductor 238, closed contacts 227, 228 of anti-jackpotting relay 27, through conductors 252, 253, through closed contacts 217, 218 of the empty switch, through conductors 254, 246, through closed contacts 164, 165 of the nickel coin switch 33, through conductor 259, through the coil 191 of the vend relay 25, through conductors 261, 262 and 244 to line L2, thus energizing vend relay 25.

Attention is also directed to the fact that, with the switch contacts of the vend relay 25, the empty switch 32 and the anti-jackpotting relay 27, in the positions shown in Figure 17, L1 power from A will always exist at point B. Power from the line L2 will always exist at point C, regardless of the condition of any of the remainder of the apparatus, as long as there is power supply to the circuit.

Closing of contacts 203, 204 establishes a holding circuit for the vend relay 25 as follows; from line L1 through the conductor 238, closed contacts 227, 228 of the anti-jackpotting relay, through conductor 252, closed contacts 217, 218 of the empty switch, conductors 254, 255, through closed contacts 208, 211 of the limit switch, through the conductor 247, closed contacts 203, 204 of the vend relay, through conductor 263, through the vend relay coil 191, conductors 261, 262 to point C and back to line L2 through conductor 244.

Power is thereupon supplied to the vend motor from line L1 through conductor 238, contacts 227, 228 of the anti-jackpotting relay 27, conductor 252, through closed contacts 198, 199 of the vend relay, through conductor 259a, through the vend motor, through conductor 262 to point C (line L2). The vend motor, therefore, will operate and will, for example, eject a package by suitable standard mechanism (not shown). The vend motor 26, as it completes its cycle, will rotate cam 210 to operate the limit switch 31 after the package is delivered, thus momentarily opening contacts 208, 211 and closing contacts 212, 213. The purpose of closing contacts 212, 213 will be explained hereinafter, but it is obvious that opening of the contacts 208, 211 immediately breaks the holding circuit through contacts 203, 204 of the vend relay and the vend relay 25 is de-energized so that the motor circuit to the contacts 198, 199 is broken, and the motor is stopped. The vend motor 26, however, coasts sufficiently to again close contacts 208, 211 and open contacts 212, 213.

*Dime operation*

Assuming that the parts are in the position shown in Figure 17 and the relays 17 and 18 are energized so that the gate 413 is in a coin accepting position and fingers 103 and 104 are withdrawn from the dime and quarter chutes, when a dime is inserted in the coin insert 41, the following circuits are established to operate the cam motor 19, the change payout solenoid 21 and the vend motor 26. As pointed out heretofore, line L1 power exists at point B. A circuit is, therefore established from line L1 through conductor 245, closed contacts 169, 171 of the dime switch 35, conductor 260, through the dime relay 15, through conductors 264, 265, 244 to line L2. The coil 48 of the dime relay is, therefore, energized and armature 49 is drawn to the attracted position. This results in closing contacts 61, 62, closing contacts 63, 64, closing contacts 65, 66 and opening contacts 67, 68. Upon closure of contacts 61, 62 and 63, 64, the coil 69 of the quarter relay is energized by the following circuit; power from line L1 at B is conducted through conductors 245 and 276, closed contacts 132, 133, conductors 272, 266 and 267, through closed contacts 63, 64, through conductors 268, 271, through coil 69 of quarter relay 16 and through conductors 265, 244 to line L2. This results in opening contacts 83, 84, closing contacts 85, 86, closing contacts 87, 88, opening contacts 89, 91 and closing contacts 92, 93, all associated with the quarter relay 16. Opening of contacts 83, 84 de-energizes the dime and quarter blocking relay 18 and opening of vend relay contacts 201, 202 de-energizes coin reject relay 17 until the vending operation is completed, at which time the quarter relay 16 is again de-energized and contacts 201, 202 are closed.

If a nickel, dime or quarter is inserted in the rejector mechanism 39 during the vending cycle, the coins are directed to the return passage 42e because gate 413 is open. The coins will follow the return path described above.

The cam motor 19 is started by the following circuits being established; from conductor 245 at B where line L1 power exists, through conductor 276, closed contacts 131, 129 of cam switch 22, through conductor 273, closed contacts 87, 88 of the quarter relay, conductor 275, through the windings of cam motor 19, and through conductor 276a to point C where L2 power exists.

The cam motor is, therefore, started and, as best shown in Figures 9 to 11, as soon as the projection 122 is moved out of the notch 118, contacts 127 and 128 are closed. Contacts 129, 131 and 132, 133 of the cam switch 22 remain closed in this part of the cycle and do not open until the high point 120 of the cam contacts the projection 122 near the end of the cycle. When this occurs, contacts 129, 131 and 132, 133 open for a short period of time, but contacts 127, 128 remain closed until the projection 122 again drops into the notch 118.

The holding circuits for the dime and quarter relays 15 and 16, after the coin switch contacts 169, 171 have opened, are as follows; the holding circuit for the dime relay is from point B where line L1 power exists, through conductors 245, 276, through closed contacts 132, 133 of cam switch 22, through conductors 272, 266, through closed contacts 61, 62 of the dime relay, through conductors 269, through coil 48 of the dime relay and through conductors 264, 265, 244, to line L2.

The holding circuit for the quarter relay is as follows; from point B where line L1 power exists, through conductors 245, 276, closed contacts 132, 133 of the cam switch 22, through conductors 272, 284 and 285, through closed contacts 85, 86 of the quarter relay, through conductor 271, through the coil 69 of the quarter relay and through conductors 265, 244 to line L2.

As soon as the coin opens contacts 169, 171, power from line L1 is then supplied by the following circuit to continue operation of the cam motor. Line L1 power from point B is conducted through conductors 245, 276, through closed contacts 129, 131 of cam switch 22, through conductor 273, closed contacts 87, 88 of the quarter relay, through conductor 275 of the cam motor 19, through the windings of the cam motor 19 to the conductor 276a, which is connected at point C to L2 power. The motor, therefore, continues to run and, when the contacts 129, 131 and 132, 133 of cam switch 22 open near the end of the cycle, as shown in Figure 11, the dime and quarter relays 15 and 16 are de-energized and contacts 87, 88 of the quarter relay 16, therefore, open.

Power is then supplied to the motor to complete the cycle by the following circuit; from line L1 power at B, through conductor 276, closed contacts 127, 128 of cam switch 22, through conductor 277, closed contacts 89, 91 of the quarter relay 16, through conductor 275, through cam motor windings to conductor 276 which is connected with line L2 power at point C. As soon as the contacts 127, 128 of the cam switch 22 open, the motor is stopped, since the quarter relay 16 has already been de-energized and no circuit is established to continue operation of the motor with contacts 87, 88, 127, 128 open.

One coin in change is paid out by the pay-out solenoid 21 which is energized one time by the following circuit; from point B through conductors 245, 276, through closed contacts 129, 131 of the cam switch 22, through conductor 273, through closed contacts 65, 66 of the dime relay, through conductor 279, through the coil of the pay-out solenoid 21, through conductors 278, 276a to point C where line L2 power exists.

It is obvious, therefore, that as soon as the dime relay 15 is energized, the pay-out solenoid 21 is energized and continues to be energized until contacts 132, 133 of cam switch 22 are opened at the end of the cycle of the cam motor 19. Although cam 116 is also being rotated and is consequently closing and opening contacts 141, 142, no power is supplied to the pay-out solenoid 21 because contacts 67, 68 of the dime switch are open.

In order to energize the vend relay 25, when a dime is used to thus operate the vend motor 26 through one vending cycle, the following circuits are initially established and the cam 116, driven by the cam motor 19, is rotated to cause such energization and momentarily close contacts 141, 142 and 143, 144, due to the extra height of lobe 135a. The coil 191 of the vend relay 25 is initially energized by a circuit starting at the point B through conductors 245 and 276, through closed contacts 132, 133, through conductors 272 and 284, closed contacts 92, 93, conductor 286, closed contacts 141, 142 and 143, 144, conductors 296, 44, 293, and 259, coil 191 and conductors 261 and 262 to the point C. Since the vend relay 25 is energized, the contacts 198, 199 and 203, 204 thereof are closed and contacts 201, 202 are opened. The vend relay 25 is, therefore, energized and the holding circuit therefor, the circuit for operating the vend motor 26 and the operation of cam 110 are thereafter the same as described with respect to the nickel operation.

When the limit switch contacts 208, 211 are opened by the cam 210 at the end of a vending cycle, the vend relay 25 and vend motor 26 are de-energized as described above. As soon as the vend relay 25 is energized, contacts 201, 202 are opened, thus breaking the circuit above described to the solenoid 94 of coin return relay 17. The bell crank lever 96, therefore, is rotated by the spring 90 and the threaded rod 96a is moved to the position shown in Figure 14, thus opening gate 413 of the coin rejector mechanism 39. When the gate 413 is open, any coins which are inserted in the mechanism 39, regardless of denomination, will be directed to the chute 42e (Figure 1) in the path described above. When the solenoid 94 is de-energized, the contacts 402 and 403 of switch 17a are open and the "5¢ only" light 28 cannot be energized, regardless of the condition of the coin magazine switch 140. During the vending cycle, the block relay 18 is also de-energized and contacts 108, 109 of switch 105 are therefore closed. However, since switch 17a is open, the "5¢ only" light will not be lit.

It is very important that the "5¢ only" lamp be extinguished during the vending cycle, and it is also important to be able to connect the coin mechanism to the vending machine circuit shown in Figure 17 without change in that circuit, since it is fairly standard on all vending machines manufactured and the coin mechanisms should be freely interchangeable. With the circuit shown, however, the "5¢ only" light will be illuminated when the vend relay operates on the vend cycle, even though sufficient coins are in the coin change magazine, unless a switch is interposed to open the circuit to the "5¢ only" light. The switch 17a serves this purpose. It is important to prevent the "5¢ only" light from being illuminated during the vend cycle particularly when sufficient change coins are available, because when one person operates the machine and obtains change, another person, with only dimes or quarters in change, may observe the "5¢ only" light, and receive the incorrect impression that no change is in the machine. The result is, at times, that the second person does not use the machine, or may go some distance for change. The present invention eliminates this fault and still permits the use of the standard vend circuit.

When the vend cycle is complete, contacts 201, 202 of the vend relay close, thus energizing solenoid 94 of the coin return relay 17, and the gate 413 is returned to its coin accepting position. The block relay 18 is also energized if the magazine switch 140 is closed, thus withdrawing fingers 103 and 104 from the coin chutes and placing the entire mechanism in condition for another vending cycle with any denomination coin.

If the magazine coin switch 140 is open because of insufficient coins in the magazine, the block relay 18 will be de-energized or will not again be energized until sufficient coins are in the coin magazine 24. When this occurs, contacts 108, 109 of switch 105 are closed and since the contacts of switch 17a are also closed, a circuit is established as follows to supply power to the "5¢ only" lamp 28; from line L2 through conductors 258 and 258a, through closed contacts 402, 403 of switch 17a, through conductor 258b, through closed contacts 108, 109 of switch 105, through conductor 301, through the lamp 28 and through conductor 249 to the point A where L1 power exists.

*Quarter operation*

When a quarter is inserted in the coin chute 38, contacts 175, 176 of the quarter switch 37 are momentarily closed. The quarter relay is, therefore, energized through the following circuit; from point B through conductor 245, closed coin switch contacts 175, 176, through conductor 282, through coil 69 of the quarter relay 16 and thence through conductors 265, 244 to line L2. In the quarter operation, only the quarter relay is energized and the dime relay is not energized. The circuit to the dime and quarter blocking relay 18 is broken because contacts 83, 84 of the quarter relay open, while contacts 85, 86 are closed until the quarter relay is de-energized near the end of the vending cycle. However, as in the dime operation, the coin return solenoid 94 is de-energized during the vending cycle with the result that gate 413 is open and coins of any denomination which are inserted at this time will be returned through return chute 42e in the path described above. Again the "5¢ only" light 28 will not light because contacts 402, 403 of switch 17a are open.

The cam motor 19 is started by the following circuit being established from point B; through conductor 245, closed contacts 175, 176 of the coin switch 37, through conductors 282, 271, closed contacts 85, 86 of the quarter relay 16, conductors 285, 284 and 272, through closed contacts 132, 133 and 129, 131 of cam switch 22, through conductor 273, through closed contacts 87, 88 of the quarter relay 16, through conductor 275, to the cam motor and through conductor 276a, 244 to line L2. As soon as the cam motor starts, the contacts 127, 128 of the cam switch 22 are closed. The holding circuit for the quarter relay 16 is the same as described hereinabove with respect to dime operation.

When the projection 122 on cam 115 is raised by the high point 120 near the end of the cycle, contacts 129, 131 and 132, 133 of the cam switch 22 open, thus breaking the circuit to the quarter relay coil 69. Contacts 89 and 91 of the quarter relay 16 thereupon close and, since contacts 127, 128 of the cam switch 22 are closed at this time, the cam motor continues to operate until the projection 122 again drops into the notch 118.

Four nickels are given in change by operating the pay-out solenoid four times. This is accomplished by the following circuits, it being understood that the cam 116 is rotated one full revolution, so that the projections 135 and 135a thereon close contacts 141, 142 four times during one cycle. The circuit is from point B through conductors 245, 276, through closed contacts 132, 133 of cam switch 22, through conductors 272 and 284, through closed contacts 92, 93 of the quarter relay 16, through conductor 286, through contacts 141, 142 of the pay-out switch 23 when they are closed, through conductor 287, closed contacts 67, 68 of the dime relay 15, through conductor 279, to the pay-out solenoid 21 and from the pay-out solenoid 21 through conductors 278, 276a and 244 to line L2.

The vend relay 25 is initially energized and vend motor 26 is started when a quarter is utilized, the following circuits being established; again, operation of the cam motor 19 and rotation of the cam 116 establish the necessary circuits. From point B through conductors 245, closed contacts 175, 176 of the quarter switch, conductors 282 and 271, closed contacts 85, 86 of the quarter relay, through conductor 285, closed contacts 92, 93 of the quarter relay, through conductor 286, closed contacts 141, 142, and 143, 144 of switch 23 when closed by the first projection 135a on cam 116, through conductor 296, closed contacts 46, 47 of the drain switch 14, through conductors 293 and 259, through coil 191 of vend relay 25 and through conductors 261, 262 to point C thus completing the circuit to energize the coil 191 of vend relay 25. Closing of the contacts 198, 199 and 203, 204 of the vend relay switch starts the vend motor 26 as described above. Thereafter, the holding circuit for the vend relay 25 and circuits for operating the vend motor 26 are the same as described with respect to the dime operation.

When the vend motor 26 has completed a vending cycle, cam 210 operates limit switch 31 to de-energize the vend relay 25 and vend motor 26.

The "5¢ only" lamp 28 will have power supplied to it when the vending cycle is ended if insufficient coins are present in the magazine 24. Under such conditions, the magazine coin switch 140 is closed and the "5¢ only" lamp 28 is energized through the same circuit as that described with respect to the dime operation.

*Drain switch circuit*

A drain switch 14 may be provided so that if it is desired to empty the coin magazine 24 for any reason, or to provide a quick method of counting coins, the drain switch may be moved to the "drain" position shown in dotted lines in Figure 17 of the drawings. In the "drain" position, the cam motor operates continuously and the pay-out solenoid 21 is energized four times upon each revolution of the cam 116. Also, the slide lock solenoid 24b of slide lock mechanism 24a is energized so that the coin slide 155 may move freely.

The drain operation is accomplished by the following circuits being established; first, the cam motor circuit is from point B through conductors 245 and 276, through closed contacts 132, 133 of the cam switch 22, through conductors 272, 295, through one set of the contacts 46, 47 of the drain switch, through conductor 294 to the cam motor and from the cam motor, through conductors 276a, 244 to line L2. As the motor continues to rotate, the contacts 132, 133 and 129, 131 will be open near the end of each cycle. However, the motor continues to operate because at that time contacts 127 and 128 of the cam switch 22 are closed and since the quarter relay 16 is not energized, contacts 89, 91 of the quarter relay are closed. A circuit, therefore, is established, which circuit is the same as described hereinbefore for continuing operation of the cam motor until the projection 122 drops into the notch 118. However, when the drain switch is being used, opening of contacts 127, 128 of the cam switch 22 does not stop operation of the motor because contacts 132, 133 are closed simultaneously with the opening of contacts 127, 128 and the circuit of the cam motor 19 is established.

The circuit for energizing the pay-out solenoid 21 four times upon each rotation of cam 116 is as follows; from point B through conductors 245, 276, through contacts 132, 133 of cam switch 22, conductors 295, 299, through one set of closed contacts 46, 47, through conductor 296, through contacts 143, 144 of pay-out switch 23, when closed, through conductor 287, through contacts 67, 68 of the dime relay 15, through conductor 279 to the pay-out solenoid 21 and back to line L2, through conductors 278, 276a and 244. It is apparent, therefore, that the cam motor 19 will operate continuously and four coins will be ejected on each revolution of the cam 116.

The slide lock mechanism 24a is provided and includes a coil 24b, and an armature 24c. When the armature is in the unattracted position as shown in Figure 17, it blocks the slide 155 of the change pay-out mechanism and prevents manual operation of the slide when no vending cycle is occurring. During the dime and quarter vending cycle, however, solenoid 24b is energized, thus actuating armature 24c and permitting free operation of the slide 155. The circuit for energizing solenoid 24b, in parallel with cam motor 19, is from line L2 through conductors 244 and 244a through the solenoid 24b, through conductors 244b and 275, through contacts 87, 88 of quarter relay 16, through conductors 274 and 273, through contacts 129, 131 of cam operated switch 22 (which are closed throughout most of the cycle as shown in Figures 9, 10 and 11), and through conductors 276 and 245 to point B where L1 power exists. The armature 24c pulls in a fraction of a second before the first raised portion 135 of cam 116. When the cam 115 nears the end of the cycle, as shown in Figure 11, contacts 128, 129 of cam switch 22 are opened, thus de-energizing the slide lock solenoid 24b. By this time, however, the correct change has been delivered. When the cam 115 reaches its initial position, contacts 128, 129 of cam switch 122 are again closed, but by this time, the quarter relay 16 has been de-energized, and contacts 87, 88 thereof opened, so that energization of the slide lock solenoid 24b will not take place again until a dime or a quarter is placed in the mechanism. The slide lock solenoid 24b is energized continuously when the drain switch is moved to engage contact 46, through a circuit set up through conductor 244c. Thus, the slide 155 is free to move.

*Nickel anti-jackpotting circuit*

If a nickel sticks on the coin switch 33, or if the contacts 164, 165 of the nickel switch remain closed for any reason, by the time a vending cycle is completed, the entire system is rendered inoperative by energization of the anti-jackpotting relay 27 which operates the latch 232 so that manual resetting is necessary. Obviously, energization of the anti-jackpotting relay 27 opens contacts 227, 228 so that the power supply from line L1 to substantially the entire system is immediately broken.

The circuit for energizing the anti-jackpotting relay 27 is as follows; through line L1, contacts 227, 228 of the anti-jackpotting relay 27, through conductors 252, 253, through contacts 217, 218 of the empty switch 32, through conductors 254, 246, through contacts 162, 165 of the nickel switch 33, through conductors 259, 263, through closed contacts 203, 204 of the vend relay 25 which are closed at this time because the vend relay is energized by the closure of the nickel switch 33, through conductor 289, through contacts 212, 213 of the limit switch which are closed by cam 210 at the end of the cycle, through conductor 291, through the coil 222 of the anti-jackpotting relay 27 and through conductors 292, 262, back to line L2 through conductor 244. The anti-jackpotting relay 27 is, therefore, energized and the power supply to the system is broken.

Upon energization of the anti-jackpotting relay 27, contacts 229, 231 thereof are closed. This lights the empty light 29, power being supplied from line L1 through closed contacts 229, 231, through the lamp 29 and through conductors 292, 262 and 244 back to line L2.

When the power to the system is cut off by energization of the anti-jackpotting relay 27, the coin return relay 17 is de-energized. This opens the gate 413 of the rejector mechanism 39 as described above, and coins of all denominations which are inserted thereafter are returned to the return chute 42e in the manner described. The block relay 18 is also de-energized and the fingers 103, 104 enter the dime and quarter coin chutes, but this has no effect on the return of the coins with gate 413 open.

*Dime anti-jackpotting circuit*

If for any reason contacts 169, 171 and the dime switch 35 remain closed or if certain of the contacts of the dime and quarter relays remain closed when they should have been opened, particularly if contacts 87, 88 and 89, 91 of the quarter relay are in an improper position, then the cam motor 19 will not complete a cycle and stops upon opening of contacts 132, 133 and 129, 131 of the cam switch 22. It is noted that as hereinbefore set forth, both the dime relay 15 and the quarter relay 16 are energized in the dime operation.

If the contacts 87, 88 are closed and contacts 89, 91 are open when the cam 115 opens contacts 129, 131 and 132, 133 of cam switch 22, no power may be supplied to the cam motor 19, even though contacts 127, 128 of the cam switch 22 are closed. Contacts 87, 88 are closed, but the fact that the other cam switch contacts are open does not permit power to be supplied to the cam motor 19. Furthermore, the circuit at that time is also broken to the pay-out solenoid 21, so that no further coins may be paid out.

In addition, the dime and quarter blocking relay 18 is de-energized because the quarter relay 16 is still energized and contacts 83, 84 are open. Therefore, it is impossible to operate dime or quarter coin switches 35 and 37, because the fingers 103, 104 block any further coins inserted and return them through the coin chute 42e. Furthermore, the coin return solenoid 94 is still energized and contacts 402, 403 of switch 17a are closed. Contacts 108, 109 of switch 105 are closed because block relay 18 is de-energized. Power is, therefore, supplied to "5¢ only" lamp 28 through the circuit described hereinbefore, regardless of whether the contacts of the nickel magazine switch 140 are opened or closed. The mechanism will still accept nickels and a vending cycle may be completed in response thereto, since cam motor 19 does not operate on nickel operation.

It will also be noted that if sufficient coins are not present in the magazine 24 to close contacts 149, 151 of the cam switch, block relay 18 is likewise de-energized but coin return relay 17 remains energized. Dimes and quarters are thereupon blocked by fingers 103 and 104, and it is necessary in this case to manually operate wiper blade 423 of the rejector mechanism 39 to eject coins from the mechanism 39 through the return chute 42e, in the manner which has been already described.

It is, therefore, impossible to obtain any further goods or services by the use of dimes or quarters. It is also impossible to obtain any pay-out of change. However, the gate 413 remains closed because the coin return relay 17 is still energized and the vend relay 25 may be energized by a nickel closing the nickel switch 33 to operate the vend motor 26.

As soon as the contacts 169, 171 of the dime switch are opened by the clearing of a coin, for example, or the dime and quarter relay contacts return to their energized position, the cycle of the cam motor is completed because contacts 89, 91 of the quarter relay close, and contacts 127, 128 of the cam switch 22 are already closed. The motor, therefore, operates for a very short period of time and when the projection 122 drops into the notch 118 of the cam 115, contacts 127, 128 of cam switch 22 open and the cam motor is de-energized. The system is then in condition for another vending cycle because dime and quarter block relay 18 is again energized by closure of contacts 83, 84 to remove fingers 103, 104 from the dime and quarter chutes, and the pay-out solenoid 21 may be energized. Also, the contacts 108, 109 of block relay 18 open, and the "5¢ only" lamp 28 is extinguished. The coin return relay 17 is already energized and gate 413 closed so that the system is again in condition to perform a vending cycle on the insertion of a coin.

*Quarter anti-jackpotting operation*

If the contacts 175, 176 of the quarter switch 37 remain closed for any reason at the time a vending cycle is about to be completed, or if the contacts of the quarter relay 16 remain in the energized position for any reason, the cam motor 19 does not complete a cycle and no further dimes or quarters may be used to initiate a vending operation. No change is paid out and the "5¢ only" lamp is illuminated.

When the cam 115 reaches the position where the high point thereof opens contacts 129, 131 and 132, 133 of cam switch 22, the cam motor ceases to have energy supplied thereto because contacts 89, 91 of the quarter relay are open. The result is the same as that described with respect to the dime anti-jackpotting operation, since the block relay 18 is de-energized and any further dimes and quarters must be manually returned. The power supply to the pay-out solenoid 21 is cut off and the "5¢ only" lamp 28 lights. Again, nickels may still be used to operate the vend relay 25 and the vend motor 26 because coin return relay 17 is energized and gate 413 is closed. Also, as soon as the contacts of the quarter switch 37 are open or the contacts of the quarter relay 16 return to their de-energized position, power is supplied to the motor because contacts 89, 91 of the quarter relay are closed and contacts 127, 128 of the cam switch 22 are also closed. The motor 19, therefore, completes its cycle and stops when the projection 122 drops into notch 118 and opens contacts 127, 128 of the cam switch 22.

From the above description, it will be apparent that the goods or services to be vended are delivered upon the insertion of a coin, even though the coin sticks and in the event a dime or a quarter sticks, the goods or services are delivered and the proper change returned for that particular vending operation. Obviously, if a nickel sticks, the entire machine is rendered inoperative, but not until the vend relay has been energized and the vend motor 26 has completed a cycle and opens limit switch contacts 208, 211. Likewise, if a dime or quarter sticks, the cam motor 19 rotates the cams 115, 116 a sufficient distance to insure proper change being returned and, of course, the vend relay 25 is energized as soon as the coin switch contacts close. Thereafter, no dimes or quarters may be utilized, but nickels may be used to obtain the goods or services.

If empty switch contacts 217, 218 are open, for example, because no merchandise is present to be vended, coin return relay 17 is de-energized and gate 413 is open, so that coins of all denominations are returned to the purchaser. Also, "empty" light 29 is illuminated to warn purchasers that no merchandise to be vended is in the vending machine.

Some changes may be made in the construction and arrangement of the parts of our device without departing from the real spirit and purpose of our invention, and it is our intention to cover by our claims any modified forms of structure and use of mechanical equivalents which may be reasonably included within their scope without sacrificing any of the advantages thereof.

We claim as our invention:

1. Coin control apparatus for operation by coins of a plurality of different denominations including a unit denomination and at least two coins of different multiple unit denominations, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in two of the passages for coins of greater than unit denomination for blocking coins entering said two respective passages when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable gate means is operated, and automatic second electrical relay means for moving at least a part of said gate means away from said base, to thereby direct coins of all denominations to said return passage, a source of power for said relay means, said manually operable means being adapted to deliver coins of said two higher denominations to said return passage if said coins have been blocked by said blocking means with said gate means closed; said coin changing mechanism comprising a coin change magazine, an electrical switch in a circuit between said source of power and said first relay means, said switch being positioned so that it is closed when sufficient coins are present in the change magazine to make change for multiple unit denomination coins, to thereby energize said first relay and move said blocking means out of said two passages, and said switch being opened when insufficient coins are present in the change magazine to make said change to thereby de-energize said first relay means and move said blocking means to the coin blocking position.

2. Coin control apparatus for operation by coins of a plurality of different denominations including a unit denomination and at least two coins of different multiple unit denominations, said apparatus comprising a coin rejecting mechanism and a coin changing mechanism; said coin rejecting mechanism comprising a mounting base, gate means, means for mounting said gate means for movement toward and away from said base to closed and open positions coin passages defining distinct accept paths for each of said denominations formed at least in part between said gate means and said base, said coin passages terminating in an accept chute, means in two of the passages for coins of greater than unit denomination for blocking coins entering said two respective passages when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable gate means is operated, and automatic second electrical relay means for moving at least a part of said gate means away from said base to thereby direct coins of all denominations to said return passage, a source of power for said relay means, said manually operable means being adapted to deliver coins of said two higher denominations to said return passage if said coins have been blocked by said blocking means with said gate means closed; said coin changing mechanism comprising a coin change magazine, an electrical switch in a circuit between said source of power and said first relay means, said switch being positioned so that it is closed when sufficient coins are present in the change magazine to make change for multiple unit denomination coins to thereby energize said first relay and move said blocking means out of said two passages, and said switch being opened when insufficient coins are present in the change magazine to make said change to thereby de-energize said first relay means and move said blocking means to the coin blocking position, said coin changer also including a vend relay for initiating a vend cycle in response to coins, said vend relay including a switch in circuit between said source of power and said second relay means, said switch being closed prior to the start of said vending cycle so that said second relay means is energized and the gate means is in the closed coin accepting position, and said contacts being open during the vending cycle so that coins of all denominations are automatically returned during the vending cycle.

3. Coin control apparatus for operation by coins of a plurality of different denominations including a coin of unit denomination and a coin of multiple unit denomination, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in the passage for the coin of multiple unit denomination for blocking the same when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable means is operated, and automatic second electrical relay means for moving at least a part of said gate means away from said base, to direct coins of all denominations to said return passage, a source of power for said relay means, said manually operable means being adapted to deliver coins of said multiple unit denomination to said return passage if said coins have been blocked by said blocking means with the gate closed; said coin changing mechanism comprising a coin change magazine, an electric switch in a circuit between said source of power and said first relay means, said switch being positioned so that it is closed when sufficient coins are present in the change magazine to make change for multiple unit denomination coins, to thereby energize said first relay and move said blocking means to the position where coins of multiple unit denomination follow the accept path and said switch being opened when insufficient coins are present in the change magazine to make said change to thereby de-energize said first relay means and move said blocking means to the coin blocking position.

4. Coin control apparatus for operation by coins of a plurality of different denominations including a coin of unit denomination and a coin of multiple unit denomination, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in the passage for the coin of multiple unit denomination for blocking the same when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable means is operated, and automatic second electrical relay means for moving at least a part of said gate means away from said base, to direct coins of all denominations to said return passage, a source of power for said relay means, said manually operable means being adapted to deliver coins of said multiple unit denomination to said return passage if said coins have been blocked by said blocking means with the gate closed; said coin changing mechanism comprising a coin change magazine, an electric switch in a circuit between said source of power and said first relay means, said switch being positioned so that it is closed when sufficient coins are present in the change magazine to make change for multiple unit denomination coins, to thereby energize said first relay and move said blocking means to the position where coins of multiple unit denomination follow the accept path and said switch being opened when insufficient coins are present in the change magazine to make said change to thereby de-energize said first relay means and move said blocking means to the coin blocking position, said gate means being opened to return coins of all denominations when the source of power to said second relay fails for any reason.

5. Coin control apparatus for operation by coins of a plurality of different denominations including a coin of unit denomination and a coin of multiple unit denomination, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in the passage for the coin of multiple unit denomination for blocking the same when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable means is operated and automatic second electrical relay means for moving at least a part of said gate means away from said base, to direct coins of all denominations to said return passage, a source of power for said relay means, said manually operable means being adapted to deliver coins of said multiple unit denomination to said return passage if said coins have been blocked by said blocking means with the gate closed; said coin changing mechanism comprising a coin change magazine, an electric switch in a circuit between said source of power and said first relay means, said switch being positioned so that it is closed when sufficient coins are present in the change magazine to make change for multiple unit denomination coins, to thereby energize said first relay and move said blocking means to the position where coins of multiple unit denomination follow the accept path and said switch being opened when insufficient coins are present in the change magazine to make said change to thereby de-energize said first relay means and move said blocking means to the coin blocking position, said coin changer also including a vend relay for initiating a vend cycle in response to coins, said vend relay including a switch in circuit between said source of power and said second relay means, said switch being closed prior to the start of said vending cycle so that said second relay means is energized and the gate means is in closed coin accepting position, and said contacts being open during the vending cycle so that coins of all denominations are automatically returned during the vending cycle.

6. Coin control apparatus for operation by coins of a plurality of different denominations including a coin of unit denomination and a coin of multiple unit denomination, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in the passage for the coin of multiple unit denomination for blocking the same when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable means is operated, and automatic second electrical relay means for moving at least a part of said gate means away from said base, to direct coins of all denominations to said return passage, a source of power for said relay means, said manually operable means being adapted to deliver coins of said multiple unit denomination to said return passage if said coins have been blocked by said blocking means with the gate closed; said coin changing mechanism comprising a coin change magazine, an electric switch in a circuit between said source of power and said first relay means, said switch being positioned so that it is closed when sufficient coins are present in the change magazine to make change for multiple unit denomination coins, to thereby energize said first relay and move said blocking means to the position where coins of multiple unit denomination follow the accept path and said switch being opened when insufficient coins are present in the change magazine to make said change to thereby de-energize said first relay means and move said blocking means to the coin blocking position, said coin changer also including a vend relay for initiating a vend cycle in response to coins, said vend relay including a switch in circuit between said source of power and said second relay means, said switch being closed prior to the start of said vending cycle so that said second relay means is energized and the gate means is in closed coin accepting position, and said contacts being open during the vending cycle so that coins of all denominations are automatically returned during the vending cycle, and indicating means adapted to be energized from said source of power to show when insufficient coins are present in the coin magazine to make proper change.

7. Coin control apparatus for operation by coins of a plurality of different denominations including a coin of unit denomination and a coin of multiple unit denomination, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, said coin passages terminating in an accept chute, means in the passage for the coin of multiple unit denomination for blocking the same when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable means is operated, and automatic second electrical relay means for moving at least a part of said gate means away from said base, to direct coins of all denominations to said return passage, a source of power for said relay means, said manually operable means being adapted to deliver coins of said multiple unit denomination to said return passage if said coins have been blocked by said blocking means said coin changing mechanism comprising a coin change magazine, an electric switch in a circuit between said source of power and said first relay means, said switch being positioned so that it is closed when sufficient coins are present in the change magazine to make change for multiple unit denomination coins, to thereby energize said first relay and move said blocking means to the position where coins of multiple unit denomination follow the accept path and said switch being opened when insufficient coins are present in the change magazine to make said change to thereby de-energize said first relay means and move said blocking means to the coin blocking position, said coin changer also including a vend relay for initiating a vend cycle in response to coins, said vend relay including a switch in circuit between said source of power and said second relay means, said switch being closed prior to the start of said vending cycle so that said second relay means is energized and the gate means is in closed coin accepting position, said contacts being open during the vending cycle so that coins of all denominations are automatically returned during the vending cycle, indicating means adapted to be energized from said source of power to show when insufficient coins are present in the coin magazine to make proper change and means for preventing energization of the indicating means during the vending cycle.

8. Coin control apparatus for operation by coins of a plurality of different denominations including a unit denomination and at least two coins of different multiple unit denominations, said apparatus comprising a coin rejecting mechanism and a coin changing mechanism; said coin rejecting mechanism comprising a mounting base, gate means, means for mounting said gate means for movement toward and away from said base to closed and open positions, coin passages defining distinct accept paths for each of said denominations formed at least in part between said gate means and said base, means in two of the passages for coins of greater than unit denomination for blocking coins entering said two respective passages when said blocking means is in one position and adapted to pass acceptable coins when in another position when said gate means is closed, first electrical relay means for operating said blocking means, a manually operable means for moving said gate means away from the base, a return passage formed at least in part by said base and said gate means into which coins are directed when said manually operable gate means is operated, and automatic second electrical relay means for moving at least a part of said gate means away from said base, to thereby direct coins of all denominations to said return passage, a source of power for said relay means, said manually operable means being adapted to deliver coins of said two higher denominations to said return passage if said coins have been blocked by said blocking means with said gate means closed; said coin changing mechanism comprising a coin change magazine, an electrical switch in a circuit between said source of power and said first relay means, said switch being positioned so that it is closed when sufficient coins are present in the change magazine to make change for multiple unit denomination coins, to thereby energize said first relay and move said blocking means out of said two passages, and said switch being opened when insufficient coins are present in the change magazine to make said change to thereby de-energize said first relay means and move said blocking means to the coin blocking position.

9. In a coin rejection system for a vending machine changer having a slug rejector comprising a coin inlet, coin return means, means including a gate for defining a path between the inlet and return means, a series of deflectors disposed in said path and operable to selectively deflect different valued coins therefrom, means mounting said gate for movement to open position to establish a path for said coins between said inlet and return means which by-passes said deflectors, manual scavenging means for removing coins from the deflectors, the improvement which comprises a mechanism movable between gate open and gate closed positions, means for continuously urging the mechanism to gate open position, first electrical means for holding said mechanism in gate closed position, stop means movable to and from deflector engaging positions to prevent the deflectors for the higher valued coins from deflecting coins and second electrical means for holding said stop means out of engaging position, coin pay out means including a coin tube, means responsive to a predetermined minimum level of coins in said tube for energizing said second electrical means, a nickel only lamp, a switch means connected to be closed when said first electrical means is energized, a second switch means connected to be closed when said second electrical means is de-energized and means connecting both said switch means in series with the lamp.

References Cited in the file of this patent

UNITED STATES PATENTS

| | | |
|---|---|---|
| 1,813,720 | Wilson | July 7, 1931 |
| 2,292,628 | Fry | Aug. 11, 1942 |
| 2,333,176 | Hoban | Nov. 2, 1943 |
| 2,354,896 | Weiler | Aug. 1, 1944 |
| 2,474,843 | Helsing | July 5, 1949 |
| 2,491,900 | Mihalik | Dec. 20, 1949 |
| 2,555,486 | Harris | June 5, 1951 |
| 2,619,213 | Harris | Nov. 25, 1952 |